(12) United States Patent
Shibasaki et al.

(10) Patent No.: US 7,837,343 B2
(45) Date of Patent: Nov. 23, 2010

(54) ILLUMINATING DEVICE AND DISPLAY DEVICE

(75) Inventors: Toshinari Shibasaki, Ibaraki (JP); Hideo Homma, Ibaraki (JP); Katsusuke Shimazaki, Ibaraki (JP); Masaya Adachi, Tokyo (JP); Sukekazu Aratani, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 174 days.

(21) Appl. No.: 11/808,077

(22) Filed: Jun. 6, 2007

(65) Prior Publication Data

US 2007/0285410 A1 Dec. 13, 2007

(30) Foreign Application Priority Data

Jun. 7, 2006 (JP) ............................. 2006-158234

(51) Int. Cl.
*F21V 9/16* (2006.01)
(52) U.S. Cl. .................. 362/84; 362/97.1; 362/332; 349/62
(58) Field of Classification Search .................. 362/33, 362/84, 97, 85, 86, 97.1, 97.4, 330, 332, 362/336; 349/69, 596, 61, 62, 68
See application file for complete search history.

(56) References Cited

U.S. PATENT DOCUMENTS

| | | | |
|---|---|---|---|
| RE27,617 E | | 4/1973 | Olsen et al. |
| 4,772,885 A | * | 9/1988 | Uehara et al. .................. 349/71 |
| 4,777,402 A | * | 10/1988 | Mitsumori .................. 313/509 |
| 6,542,207 B1 | * | 4/2003 | Yoshizawa .................. 349/69 |
| 6,639,358 B2 | * | 10/2003 | Ishikawa et al. ............. 313/504 |
| 6,671,014 B2 | * | 12/2003 | Yokoyama et al. ............ 349/65 |
| 6,921,627 B2 | * | 7/2005 | Tada et al. .................. 430/314 |
| 2003/0122480 A1 | * | 7/2003 | Wei et al. .................... 313/506 |
| 2005/0231085 A1 | * | 10/2005 | Song et al. .................. 313/110 |

FOREIGN PATENT DOCUMENTS

| | | | |
|---|---|---|---|
| JP | 5-108023 A | | 4/1993 |
| JP | 6-504627 A | | 5/1994 |
| JP | 10172756 A | * | 6/1998 |
| JP | 2004039500 A | * | 2/2004 |
| JP | 2004127662 A | * | 4/2004 |
| JP | 2005010302 A | * | 1/2005 |
| KR | 2004-73648 A | | 8/2004 |

OTHER PUBLICATIONS

Koren Office Action issued on Oct. 31, 2009 in corresponding Korean Application No. 2007-54845 with partial English translation.

* cited by examiner

*Primary Examiner*—Hargobind S Sawhney
(74) *Attorney, Agent, or Firm*—Birch, Stewart, Kolasch & Birch, LLP (57) ABSTRACT

An illuminating device includes a light-condensing sheet, a light-emitting portion, and a control unit. The light-condensing sheet includes a plurality of lenses each with a light-condensing function ranged on a light transmittance substrate. The light-emitting portion is opposed to the light-condensing sheet and includes light-emitting areas with respective dimensions. The control unit switches a luminous state of the light-emitting area to a non-luminous state or vice versa. A display device is provided with the illuminating device described above.

5 Claims, 9 Drawing Sheets

ILLUMINATING DEVICE AND DISPLAY DEVICE

BACKGROUND OF THE INVENTION

The present invention relates to an illuminating device and a display device provided with the illuminating device.

Today, a liquid crystal display device is now being rapidly spread in portable phones and information terminals provided in computers and ATMs and used in many and various environments. This rapid spread of the liquid crystal display device and the use thereof in many and various environments have required a characteristic of controlling an angle of visual field of each of image display elements composing the display device. The conventional liquid crystal display device is made so that not only a viewer located in front of the display but also another viewer located around the display can recognize the contents appearing on the display. In order to protect personal information contained in the contents appearing on the display, therefore, it is preferable to make the visual field angle narrower so that only the viewer located in front of the display can recognize the contents appearing on the display. On the other hand, when two or more viewers watch the display device or one viewer watches the display elements in multiple directions as the viewer moves his or her point of view, it is preferable to make the visual field angle wider.

As to the portable phone, the display contents are recognized in front of the display almost at any time. Hence, the display device provided in a portable phone is being required to make the visual field angle narrower so that the necessary ray of light is emitted only in the front direction, thereby making the power consumption lower. On the other hand, today, the portable phone is commonly equipped with a digital cameral function and a TV receiving function. The use of these functions needs a wider visual field angle. Hence, the portable phone is required to have a function of switching a narrow visual field angle to a wide visual field angle or vice versa.

To make the visual field angle narrower, there has been proposed a film having light transmittance portions and light absorption portions patterned at a certain period. (Refer to the documents Reissued U.S. Pat. No. Re. 27,617, JP-A-6-504627.) Concretely, a pattern period width of each combination of the light transmittance portion and the light absorption portion and a film thickness serve to shade a ray of light entered at a more angle than the geometrically defined angle. This makes it possible to restrict the visual field angle. The use of this type of film needs to paste or remove the film in order to switch an operation at a wide visual field angle to an operation at a narrow visual field angle or vice versa.

Practically, hence, the visual field angle characteristics, the wide angle or the narrow angle, cannot be arbitrarily used.

As another idea, there has been proposed a system of separately providing a liquid crystal panel for controlling the visual field angle and thereby switching one visual field angle to another by an electric operation. (For example, refer to the document JP-A-5-108023.) The fundamental principle of this system is analogous to that of the foregoing film-pasted liquid crystal display device. That is, the light transmittance portion and the light absorption portion are obtained by adjusting the orientation of liquid crystal molecules.

As described above, any conventional illuminating device is made so as to shade and absorb a ray of light in an area of a wide visual field angle when it is operated at a narrow visual field angle. Hence, the conventional illuminating device has a shortcoming that when it is operated at a narrow visual field angle, the luminance of the display is made lower than the luminance thereof when it is operated at a wide visual field angle. Further, when operated at a narrow visual field angle, in order to secure the same luminance of the display given when operated at a wide visual field angle in consideration of the reduction of the luminance, disadvantageously, the power consumption of the illuminating device is increased.

SUMMARY OF THE INVENTION

It is an object of the present invention to provide the illuminating device and the display device provided therewith which are capable of implementing the operations both at the wide visual field angle and at the narrow visual field angle.

According to an aspect of the invention, the illuminating device includes a light-condensing sheet having light-condensing lenses ranged on a light transmittance substrate, each light-condensing lens having a light-condensing function, a light-emitting portion having a plurality of light-emitting areas with respective dimensions, and a control unit for switching a luminous state of each of those light-emitting areas into a non-luminous state thereof or vice versa.

In the foregoing composition, the control unit controls to make the light-emitting areas around an optical axis of each light-condensing lens active (light-emitted) or make the other light-emitting areas non-active. This control enables the illuminating device to be operated at a narrow visual field angle. Further, the control portion controls to make only the other light-emitting areas active or make the overall light-emitting areas active. This control enables the illuminating device to be operated at a wide visual field angle, so that the illuminating device may be operated both at the narrow visual field angle and at the wide visual field angle.

Preferably, the light-emitting portion is composed of an electroluminescent element having a luminous layer and a pair of electrodes sandwiching the luminous layer therebetween. This composition makes it possible to easily adjust the area dimensions (referred simply to as dimensions) and the position of the light-emitting area by changing the patterning and the laminating structure of the luminous layer and the electrodes.

Further, the electrode is separated into plural parts by patterning and the control unit supplies each patterned electrode with electric power so that the control unit may switch the luminous state to the non-luminous state or vice versa.

Moreover, those electrodes are separated into upper electrodes located on top of the light-emitting layer and lower electrodes located on the bottom of the light-emitting layer, the patterns of which are mismatched to those of the upper electrodes. The control unit controls to make the light-emitting area at each cross point between the upper electrode and the lower electrode active. This composition makes it easier to manufacture the light-emitting portion.

The upper and the lower electrodes are patterned linearly and rectangularly so that those electrodes are located like a lattice in a manner to sandwich the light-emitting layer therebetween. This location enables the light-emitting areas to be condensed at high density, thereby being able to improve the emission intensity.

Moreover, a plurality of luminous layers may be provided so that each luminous layer has the corresponding area dimensions and position. In this case, it is preferable to form the electrodes except the bottom one of a transparent conductive material. This makes it possible to optionally design the patterning form of the light-emitting area without being restricted by the electrodes.

The luminous layers are laminated integrally on one substrate. The electrode located between the upper and the lower luminous layers is served as a common electrode of the luminous layers laminated vertically. This also makes it possible to more easily manufacture the light-emitting portion.

Further, the light-condensing sheet is formed of the light-condensing lenses and the light transmittance substrate integrally bonded therewith. This is effective in improving the manufacturing yields of the illuminating device.

Moreover, the light-emitting portion is located on an opposed surface of the light transmittance substrate to the surface on which the light-condensing lenses are ranged. This location makes it possible to surprisingly improve an accuracy of positioning the light-emitting portion and the light-condensing lenses.

The display device according to the present invention is equipped with the illuminating device described above. The illuminating device formed above may be operated both at a wide visual filed angle and at a narrow one.

The present invention offers the illuminating device and the display device provided therewith which may be operated both at a wide visual field angle and at a narrow one.

Other objects, features and advantages of the invention will become apparent from the following description of the embodiments of the invention taken in conjunction with the accompanying drawings.

DESCRIPTION OF THE EMBODIMENTS

Hereafter, the best modes of carrying out the present invention will be described with reference to the appended drawings.

Figure 1A:
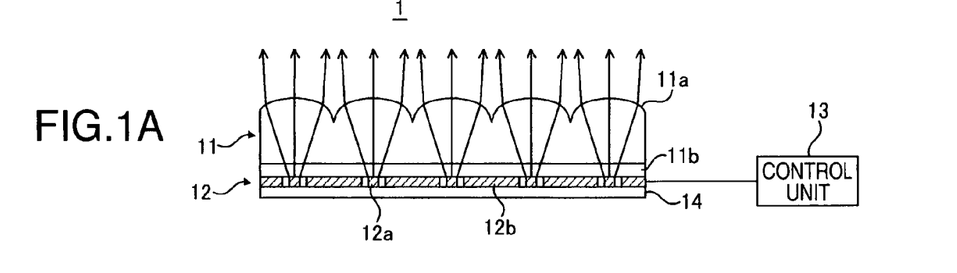
FIGS. 1A and 1B are model views showing an illuminating device according to a typical embodiment of the present invention.
Figure 1B:
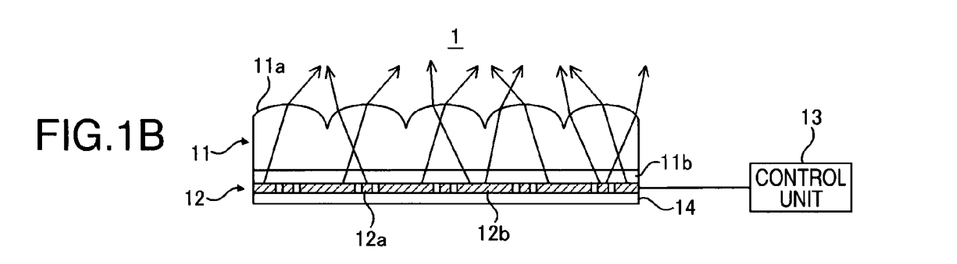

A schematic composition of an illuminating device according to the present invention will be described with reference to FIGS. 1A and 1B. FIGS. 1A and 1B are model views showing one exemplary composition of the illuminating device according to the present invention. As shown in FIGS. 1A and 1B, the illuminating device 1 includes a light-condensing sheet 11, a light-emitting portion 12, and a control unit 13. The light-condensing sheet 11 and the light-emitting portion 12 are located on a substrate 14 sequentially in the light-emitting direction.

The light-condensing sheet 11 includes a light transmittance substrate 11a and a lens portion 11b. The lens portion 11b is formed of a plurality of light-condensing lenses each having a light-condensing function, which lenses are ranged two-dimensionally on the light transmittance substrate 11a.

The light-emitting portion 12 is served as a light source of the illuminating device 1 and is located as opposed to the light-condensing sheet 11. The light-emitting portion 12 includes light-emitting areas 12a and 12b with respective dimensions, which are opposed to the principal surface of the light-condensing sheet 11. The light-emitting area 12a is a small area with small dimensions and the light-emitting area 12b is a large area with great dimensions.

The small light-emitting area 12a is located closer to the optical axis of the lens portion 11b included in the light-condensing sheet 11. In other words, it is located substantially under each light-condensing lens. On the other hand, the large light-emitting area 12b is located between the light-condensing lenses of the lens portion 11b and out of the portion substantially under each light-condensing lens.

The control unit 13 controls to switch a narrow visual field angle to a wide visual field angle or vice versa. In particular, the control unit 13 controls to switchably make each light-emitting area 12a or 12b active or non-active.

The model view shown in FIG. 1A illustrates the illuminating device 1 being operated at a narrow visual field angle. As shown in FIG. 1A, when the control unit 13 makes only the light-emitting area 12a active, almost of the light emitted by the light-emitting portion 12 (light-emitting area 12a is condensed by each light-condensing lens composing the lens portion 11b. Hence, the ray of light emitted from the light-emitting portion 12 is converted into a substantially parallel ray of light, which goes outside. This enables the illuminating device 1 to obtain the narrow visual field angle characteristic.

The model view of FIG. 1B illustrates the illuminating device 1 being operated at a wide visual field angle. As shown in FIG. 1B, when the control unit 13 controls to make the light-emitting area 12b active, the ray of light emitted by the light-emitting portion 12 (light-emitting area 12b) is not condensed by the lens portion 11, so that the ray of light is not converted into the parallel ray. Also when the control unit 13 makes the overall surfaces of the light-emitting areas 12a and 12b active, the ray of light emitted by the light-emitting portion 12 is not condensed by the lens portion 11b, so that the ray of light is converted into the parallel ray. Hence, the ray of light outgoes at a wide angle. This enables the illuminating device 1 to obtain the wide visual field angle characteristic.

As described above, the illuminating device according to the present invention is a variable visual field angle type illuminating device that may switch the visual field angle characteristic by changing the active area from the light-emitting area 12a to the area 12b or vice versa. This illuminating device 1 provides a capability of easily performing a switch between a wide visual angle operation and a narrow visual angle operation by switching one light-emitting area 12a or 12b to the other area.

Further, the light emitted by the light-emitting portion 12 is not shaded and absorbed when the illuminating device 1 is operated both at a narrow visual field angle and at a wide visual field angle. Hence, unlike the conventional system, the illuminating device 1 of the present invention enables to switch the visual field angle without having to lose the electric power. It means that the illuminating device 1 of the present invention provides both of high luminance and low power consumption performances.

In this embodiment, the light-emitting area 12a or 12b has two switching steps, that is, the luminous (active) state and the non-luminous (inactive) state. Instead, the light-emitting area 12a or 12b may have multi switching steps of emission intensity.

Hereafter, the illuminating device according to the present invention will be described in more detail with reference to the first to the fourth embodiments. These embodiments concern with various forms of the light source 12.

First Embodiment (Matrix Wirings Pasting System)

Figure 2:
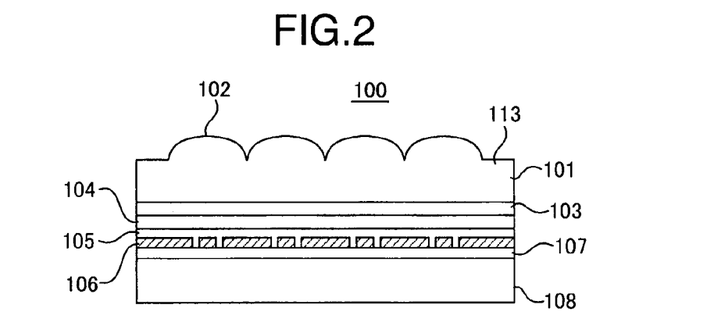
FIG. 2 is a model view showing a structure of an illuminating device according to a first embodiment of the present invention.
Figure 3:
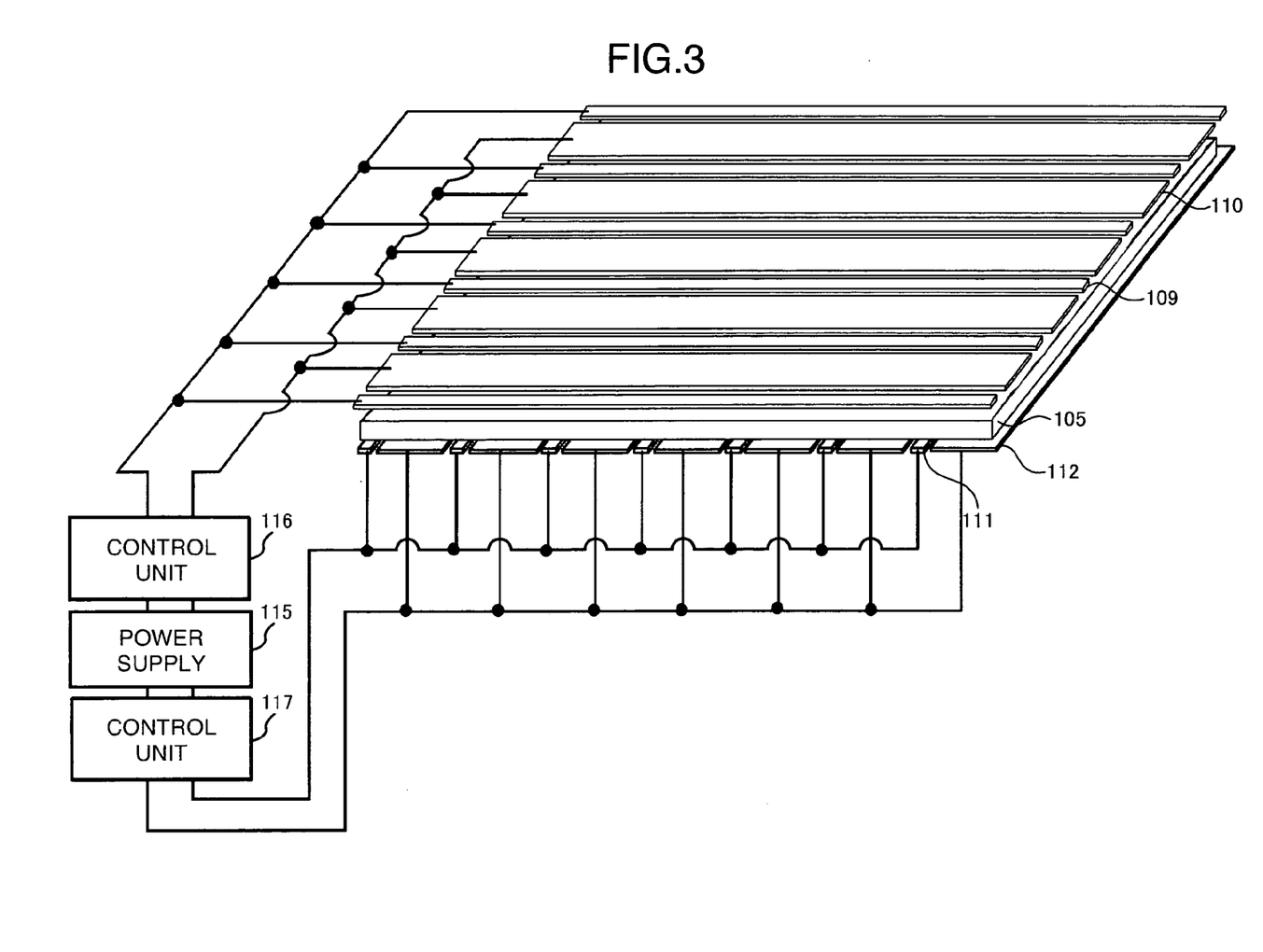
FIG. 3 is a model view showing electrodes and luminous layers included in the illuminating device according to the first embodiment of the present invention.
Figure 4A:
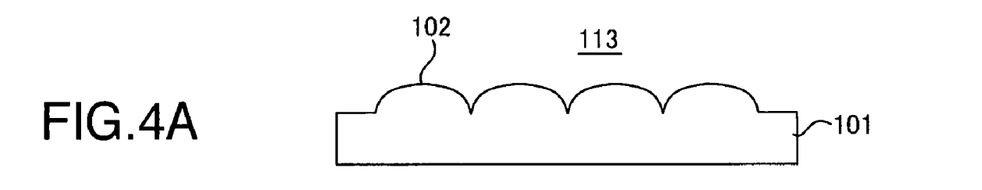
FIGS. 4A to 4D are model views for describing a process for manufacturing an electroluminescent element included in the first embodiment of the present invention.
Figure 4B:
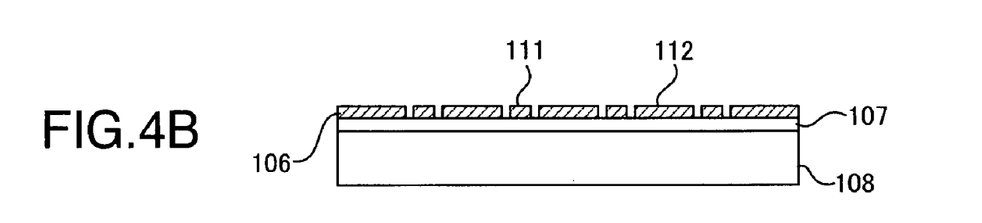
Figure 4C:
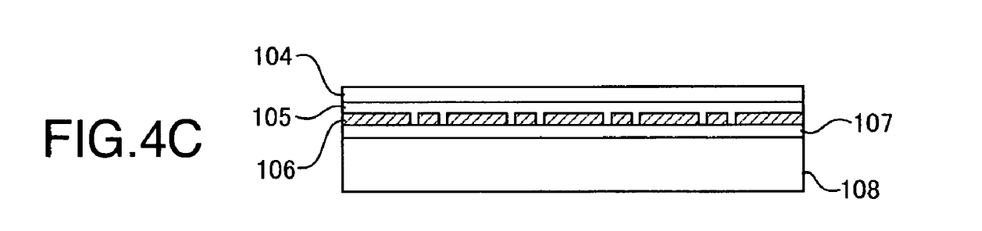
Figure 4D:
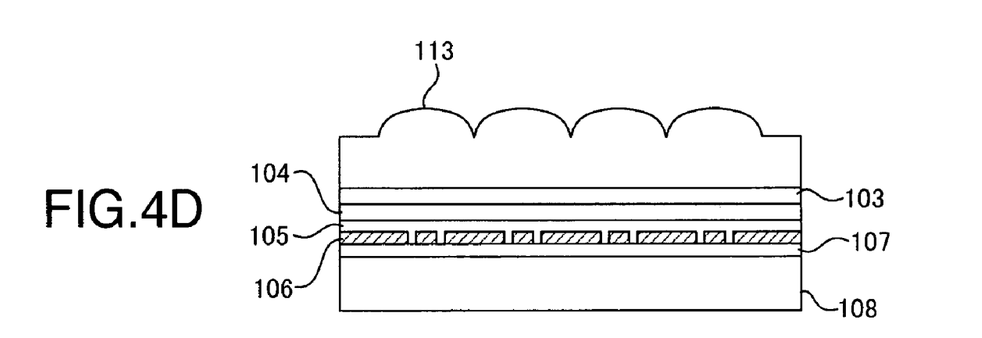

FIG. 2 is a model view showing an illuminating device according to the first embodiment. FIG. 3 is a model view showing the structure of electrodes and luminous layers composing the illuminating device according to the first embodiment. FIG. 4 is a model view showing a process for manufacturing the illuminating device according to the first embodiment.

As shown in FIG. 2, the illuminating device 100 is formed of a light-condensing sheet 113 having light-condensing lenses 102 ranged on a transparent substrate 101 and an adhesion layer that pastes the light-emitting member with each other member.

The light-condensing sheet 113 is formed of a substrate 101 composed of a transparent material and plural light-condensing lenses 102 composed of the same transparent material integrally on the substrate 101. The light-condensing sheet 113 is formed by the 2P technique, the injection molding technique, the Sol-Gel technique, the hot embossing technique or the like, a proper one of which is selected according to the kind of the transparent material to be used. It is preferable that the substrate 101 has a barrier characteristic to the atmosphere for the purpose of protecting the light-emitting member. Hence, it is preferable that the substrate 101 is formed of a material that does not pass through oxygen and vapor contained in the atmosphere or is coated with a protective film formed of such a material.

The light-condensing lens 102 is formed to have a spherical section or a convex section being closer to a spherical surface. The light-condensing lens 102 is located optionally on the substrate. The form of the light-condensing lens 102 and the array of the lenses 102 on the substrate 101 may be properly designed in light of the light source. Herein, the light-condensing lens 102 is formed to have a spherical surface with a lens diameter of 75 μm and a lens height of 16 μm and the lenses 102 are ranged in square lattice with a pitch of 80 μm.

On a required portion of the light-condensing sheet 113, an alignment mark, which is used for aligning the light-emitting area formed on the light-emitting member with the sheet 113 itself, is formed by a required means such as printing or laser cutting. The light-condensing sheet may be manufactured by various methods. Herein, the following method was used.

After coating resist on a silicon substrate, a columnar resist pattern was formed by means of the photolithography technique. By heating the resist resin to reflow it, the lens form was produced. With this as a matrix, a nickel die was produced by means of the electrotyping technique. Then, with this die, a lens pattern was formed on a mirror polished glass substrate by means of the 2P (Photo Polymer) technique. In addition, on the glass substrate 101, not only the lens pattern but also the alignment mark was produced. The alignment mark is used for aligning the light-emitting portion to be produced next with the glass substrate itself. (Refer to FIG. 4A.)

As the light-emitting member, an electrode with a desired pattern was produced. To produce this electrode, an $SiO_2$ film 107 was formed as an insulating layer on a metallic substrate 108 with a thickness of 200 μm by means of the sputtering technique and then with a mask pattern a desired aluminum pattern was formed by means of the vapor deposition. This electrode will be referred to as an aluminum patterning electrode 106. The electrode was formed to have a thickness of 100 nm. As the electrode pattern, a thin line pattern 111 with a width of 10 μm and a band pattern 112 with a width of 60 μm are alternately ranged in rectangles at regular intervals of 5 μm.

Further, a luminous layer 105 was formed by means of the vapor deposition technique. The luminous layer is formed to have a lamination of a positive hole transport layer, an organic luminous layer and an electron injection layer. The positive hole transport layer is made of αNPD with a positive hole transport characteristic and has a thickness of 40 nm. The organic luminous layer is made of tris (8-quinolinolate) aluminum complex (referred to as Alq) and has a thickness of 30 nm. The electron injection layer is made of Alq with lithium doped thereto and has a thickness of 30 nm. Hereafter, this lamination will be referred to as an electroluminescence luminous layer.

Then, with a proper mask, an electrode with a desired pattern made of ITO was produced on the electroluminescence luminous layer by means of the vapor deposition technique. This electrode will be referred to as an ITO-patterning electrode. The thickness of the electrode is 200 nm. (Refer to FIG. 4B.) The pattern and the location of the electrode are the same as those described above. However, the electrode is oriented at an angle of 90 degrees so as to be crossed with the lower electrode 106. (Refer to FIG. 3). This orientation makes the crosses between the thin line electrodes the square lattice array with a pitch of 80 μm when the top electrode 104 and the lower electrode 106 are plane-projected onto the luminous layer 105. Further, like the side of the light-condensing sheet 113, an alignment mark pattern was produced also on the side of the light-emitting portion.

Lastly, by using the alignment mark patterns formed on the sides of the light-condensing sheet 113 and the light-emitting portion, the thin line pattern crosses are adjusted in position to meet the central axes of the light-condensing lenses (102) of the light-condensing sheet and then the light-condensing sheet 113 and the light-emitting portion are fixed with each other by a transparent bonding material 103. (Refer to FIG. 4D.)

Then, the electroluminescence element produced as described above was connected with a power supply 215 for supplying the element with an electric power, the patterns 209, 210 of the upper and the lower electrodes of the luminous layer, wiring portions for connecting the power supply 215 and a control unit 216, and the control unit 216 for switching the connection of each wiring portion and thereby distributing an electric power to a proper destination.

The illuminating device constructed as described above was operated as follows. The outgoing ray of light was examined in detail.

(a) An electric power was fed to the thin line patterns 209 and 210 of the lower electrode 106 and the upper electrode 104 in order to cause the element to be active (luminous). It was found from the observation of the luminous state with an optical microscope that only the crosses between the upper and the lower thin film patterns are caused to emit light. Further, the dependency of a luminance upon an angle about an outgoing ray of light, emitted from the luminous layer 205 and then got out of the light-condensing sheet 113, was measured. It was also found from the measurement that letting zero degree be a normal line direction of the light-condensing sheet, the luminance in the direction of zero degree becomes maximum and in the angle range over +20 and −20 degrees, the luminance is reduced by $\frac{1}{10}$ or less relative than the luminance in the direction of zero degree, that is, the narrow visual field angle characteristic is obtained.

(b) An electric power was fed to all the thin line and the band electrode patterns 209 and 210 of the lower electrode 106 and the upper electrode 107 in order to cause the element to be active (luminous). It was found from the observatory of the luminous state with an optical microscope that the substantially overall surface of the element is caused to be active except the partial area with no cross between the thin line and the band electrode patterns of the upper and the lower electrodes. Further, the dependency of a luminance upon an angle about an outgoing ray of light, emitted from the luminous layer and got out of the light-condensing sheet, was measured. It was also found from the measurement that letting zero degree be a normal direction of the light-condensing sheet, the luminance is substantially uniform in the angle range of +80 to −80 degrees, that is, the wide visual field angle characteristic is obtained.

As described above, the visual field angle switchable illuminating device 100 was obtained by a simple operation.

In the first embodiment, the upper and the lower electrodes 104 and 106 with the luminous layer 105 laid therebetween are formed to be linear and the electrodes are located to be crossed with each other at right angles. In actual, any arrangement may be used if the dimensions and the location of the light-emitting area may be changed by switching the electrode to be supplied with an electric power. For example, in the first embodiment, the upper and the lower electrodes 104 and 106 are located to be crossed with each other at right angles. Instead, the upper and the lower electrodes 104 and 106 may be located to be crossed with each other at 60 degrees and the crosses between the thin line electrodes may be located in a hexagonal closest packing manner. In this location, the lenses formed on the light-emitting sheet may be located in a hexagonal closet packing manner as being matched to the crosses.

Also in the first embodiment, the luminous layer 105 is formed to have a lamination of a positive hole transport layer, an organic luminous layer and an electron injection layer. The present invention is not limited to this formation. For example, the luminous layer 105 may be formed to have a lamination of a positive hole injection layer, a positive hole transport layer, an organic luminous layer, an electron transport layer and an electron injection layer. Moreover, the material of each layer is not limited to the foregoing material. The known material having been conventionally used for making the electroluminescence element may be used for the purpose. Further, the luminous layer may be formed of an inorganic compound like ZnS. The material of the reflective electrode is not defined only if it is high in reflectance and chemically stable.

Second Embodiment (Formation of Lenticular Wiring and Light-Emitting Portion on Light-Condensing Sheet)

Figure 5:
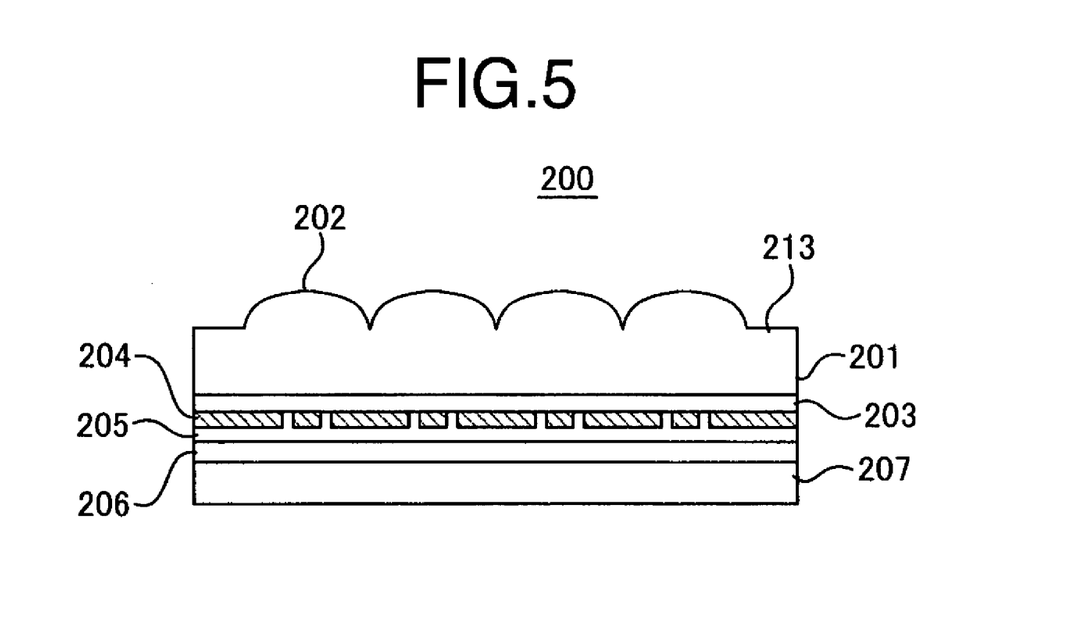
FIG. 5 is a model view showing a structure of an illuminating device according to a second embodiment of the present invention.
Figure 6:
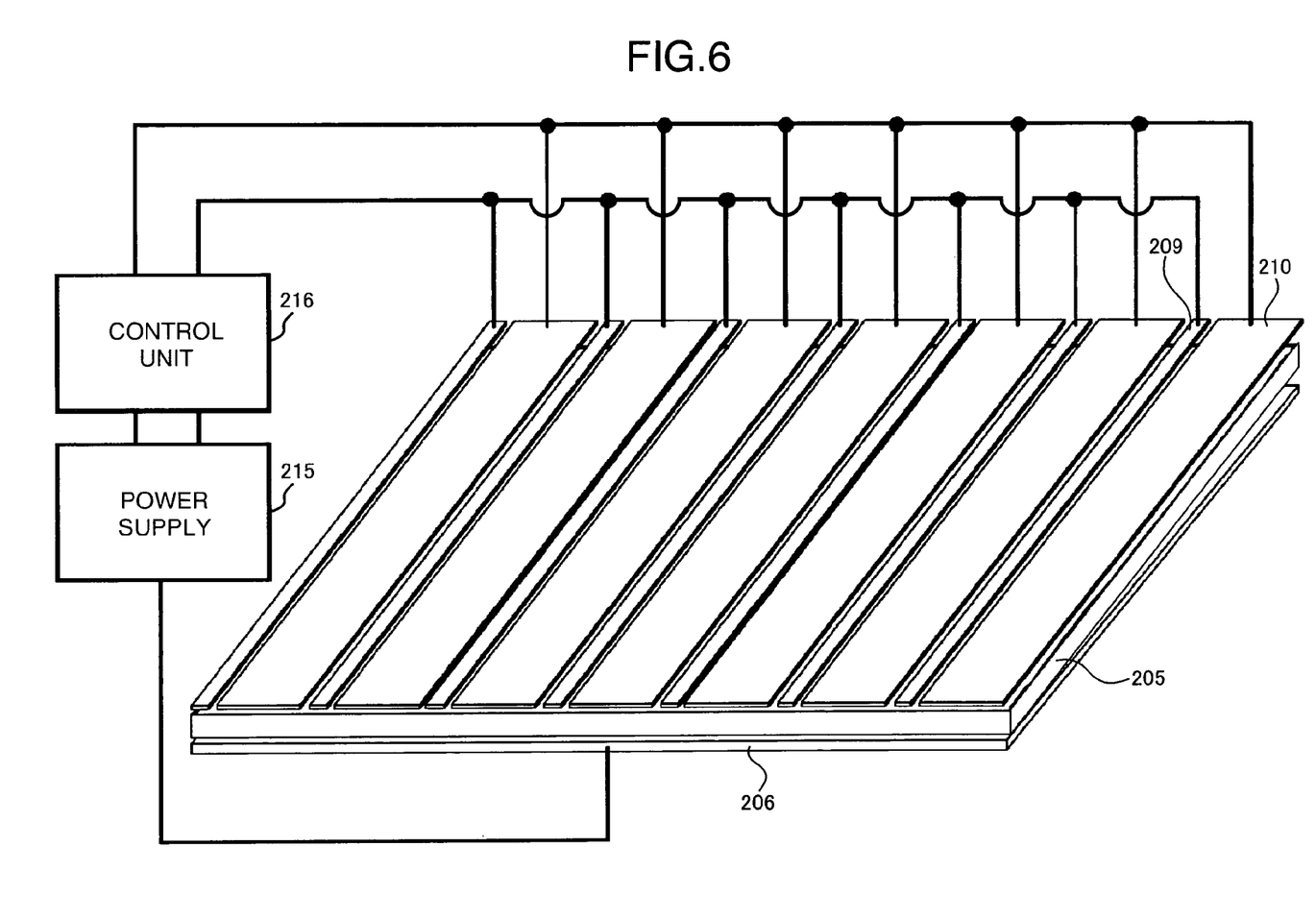
FIG. 6 is a model view showing a location of electrodes and luminous layers included in the illuminating device according to the second embodiment of the present invention.
Figure 7A:
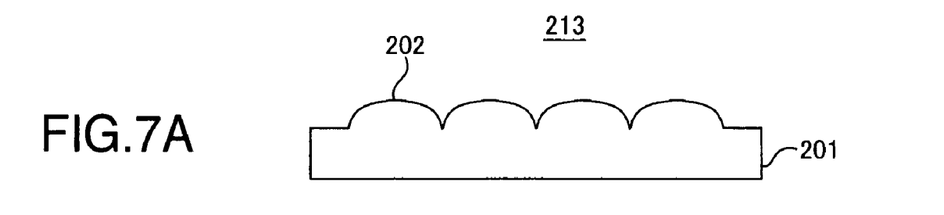
FIGS. 7A to 7D are model views for describing a process for manufacturing an electroluminescent element included in the second embodiment of the present invention.
Figure 7B:
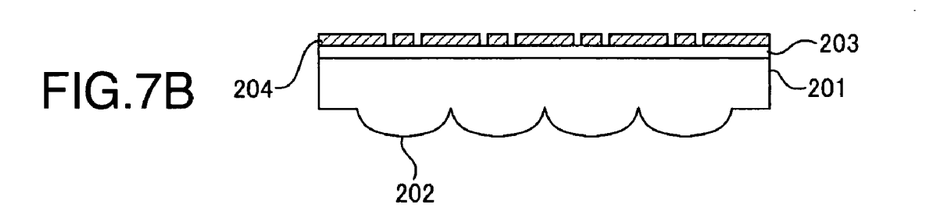
Figure 7C:
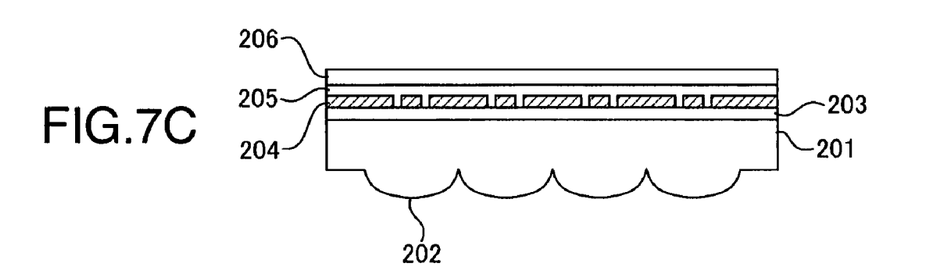
Figure 7D:
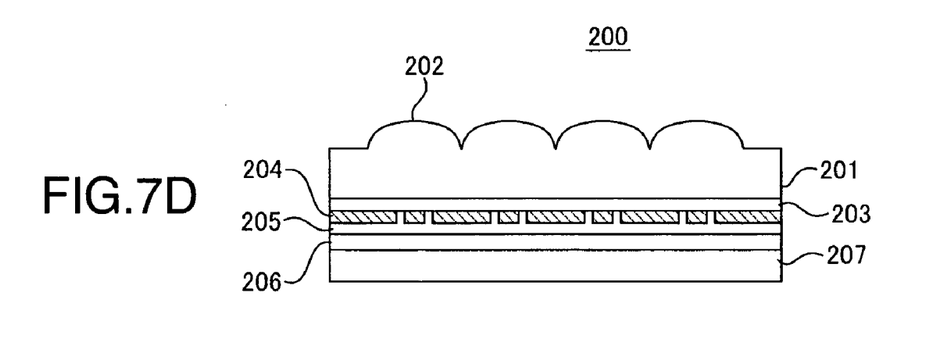

FIG. 5 is a model view showing an illuminating device according to the second embodiment of the present invention. FIG. 6 is a model view showing the location of electrodes and a luminous layer composing the illuminating device according to the second embodiment. FIG. 7 is a model view showing a process for manufacturing the illuminating device according to the second embodiment.

As shown in FIG. 5, the illuminating device 200 according to the second embodiment is composed of a light-condensing sheet having lenses 202 each with a light-condensing function ranged on a transparent substrate 201 and a light-emitting portion integrally formed on the opposite side of the transparent substrate 201 to the side where the lenses 202 are formed.

In the light-condensing sheet portion 213, the light-condensing lenses 202 made of a light transmittance material are integrally formed on the substrate 201 made of the same light transmittance material. To form the sheet, the 2P technique, the injection molding technique, the Sol-Gel technique, or the hot embossing technique may be used according to the kind of the light transmittance material to be used. It is preferable that the substrate 201 has a barrier characteristic to the atmosphere for the purpose of protecting the light-emitting member 2. Hence, the substrate 201 should be made of a material that disables oxygen and vapor in the air to be transmitted. Or, the substrate 201 should be coated with a protective film made of such a material.

The light-condensing lens 202 is formed to have a spherical section or a convex surface being closer to a spherical surface. The lenses 202 are optionally located on the substrate. The form of each lens 202 and the arrangement of the lenses 202 may be optionally designed in light of the light source. Herein, the lenticular lens was used. The lenses 202 were formed by transcribing resin lenses on the glass substrate 201 by means of the 2P technique. The material of the substrate is borosilicate glass with a refractive index of 1.5. The material of the lens is acrylic UV hardening resin with a refractive index of 1.5. The curvature radius of the lenticular lens is 45 µm. The thickness between the vertex of the lens and the rear surface of the substrate is 120 µm. (Refer to FIG. 7A.)

On the rear surface (smooth surface) of this sheet, a linear ITO transparent electrode pattern 209 with a width of 10 µm was formed immediately below the vertex of each lenticular lens by means of the sputtering technique. Further, a band-like second transparent electrode pattern 210 with a width of 50 µm was formed between the adjacent transparent electrode patterns with a spacing of 5 µm. The thickness of the transparent electrode layer 210 was 30 nm (Refer to FIG. 7B.) Then, an electroluminescence luminous layer 205 was formed by means of the vapor deposition technique. The structure of the luminous layer 205 is the same as that described with respect to the first embodiment. Further, as a lower electrode 206, an AL layer with a thickness of 50 nm was laminated. (Refer to FIG. 7C.) Lastly, silicon oxide was formed as an insulating layer 207 served as a protective layer of the light-emitting portion. The thickness of the insulating layer 207 is 200 nm. (Refer to FIG. 7D.)

Then, as shown in FIG. 6, the electroluminescence element produced as described above was connected with a power supply 215, wiring portions for connecting the patterns 209 and 210 of the upper and the lower electrodes 204 and 206 of the luminous layer 205, the power supply 215 and a control unit 216, and the control unit 216 for switching the connection of each wiring portion and thereby distributing an electric power to a proper destination.

The illuminating device 200 constructed as described above was operated as follows. The outgoing ray of light was examined in detail.

(a) A voltage was applied to the thin line patterns 209 and 210 of the lower electrode 206 and the upper electrode 204 in order to cause the element to be active (luminous). It was found from the observation of the luminous state with an optical microscope that only the portions immediately below the upper thin line patterns are caused to emit light. Further, the dependency of a luminance upon an angle about an outgoing ray of light, emitted from the luminous layer 205 and then got out of the light-condensing sheet 213, was measured. It was also found from the measurement that letting zero degree be a normal line direction of the light-condensing sheet, the luminance in the direction of zero degree becomes maximum and in the direction of crossed with the lenticular lens 202 at right angles, in the angle range over +20 and −20 degrees, the luminance is reduced by $\frac{1}{10}$ or less relative than the luminance in the direction of zero degree, that is, the narrow visual field angle characteristic is obtained.

(b) An electric power was fed to all the thin line and the band electrode patterns 209 and 210 of the lower electrode 206 and the upper electrode 204 in order to cause the element to be active (luminous). It was found from the observatory of the luminous state with an optical microscope that the substantially overall surface of the element is caused to be active. Further, the dependency of a luminance upon an angle about an outgoing ray of light, emitted from the luminous layer and got out of the light-condensing sheet, was measured. It was also found from the measurement that letting zero degree be a normal direction of the light-condensing sheet, the luminance is substantially uniform in the angle range of +80 to −80 degrees, that is, the wide visual field angle characteristic is obtained.

As described above, the visual field angle switchable illuminating device 100 was obtained by a simple operation.

Third Embodiment

<Lamination of Luminous Layer>

Figure 8:
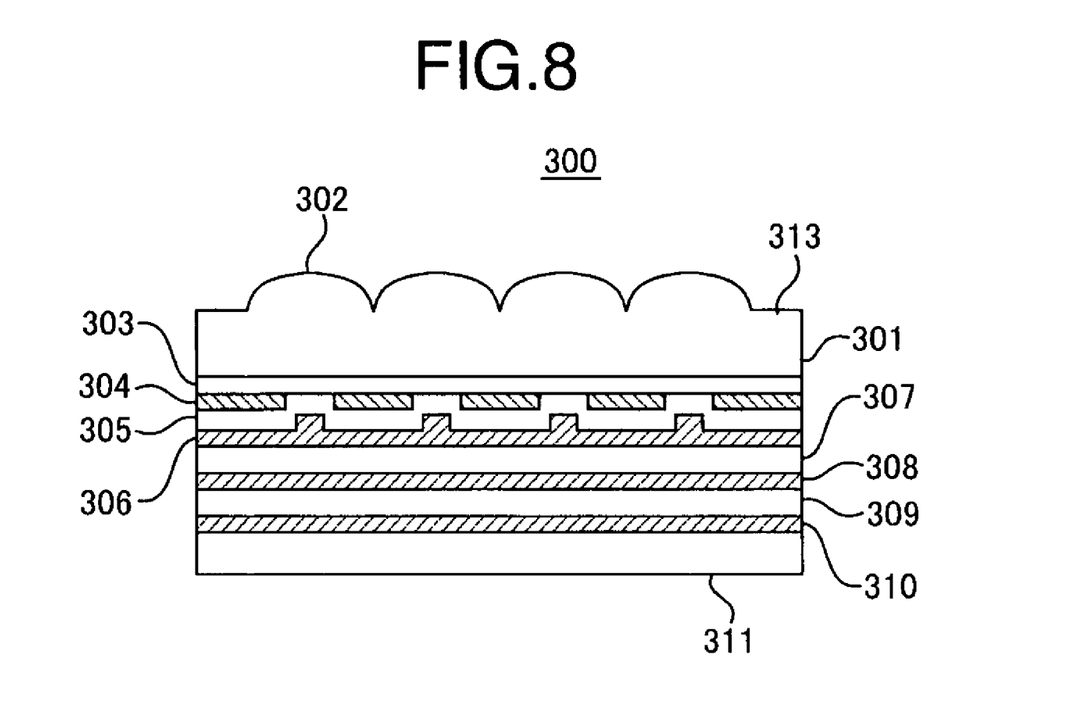
FIG. 8 is a model view showing a structure of an illuminating device according to a third embodiment of the present invention.
Figure 9A:
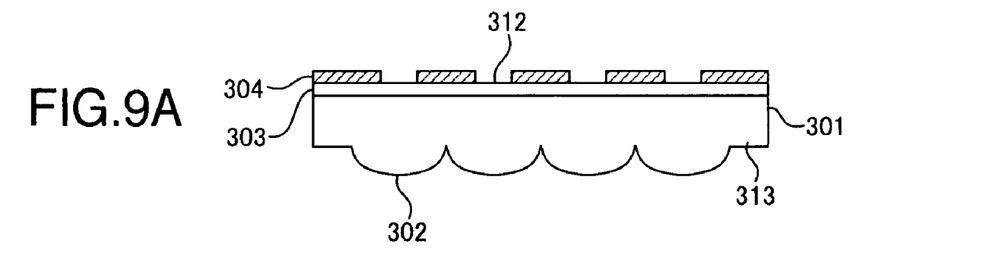
FIGS. 9A to 9D are model views for describing a process for manufacturing an electroluminescent element included in the third embodiment of the present invention.
Figure 9B:
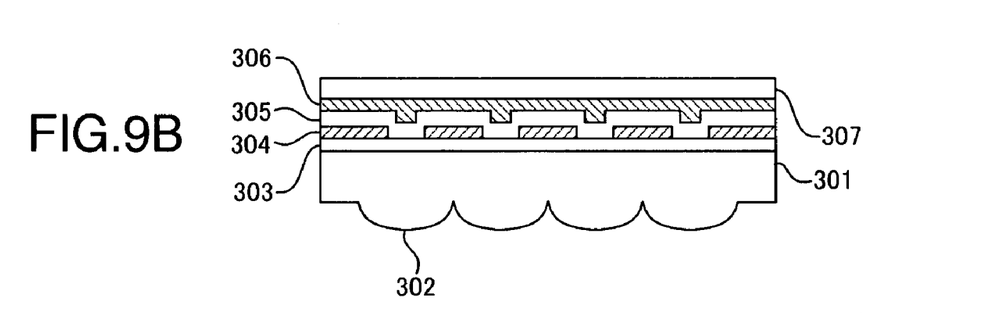
Figure 9C:
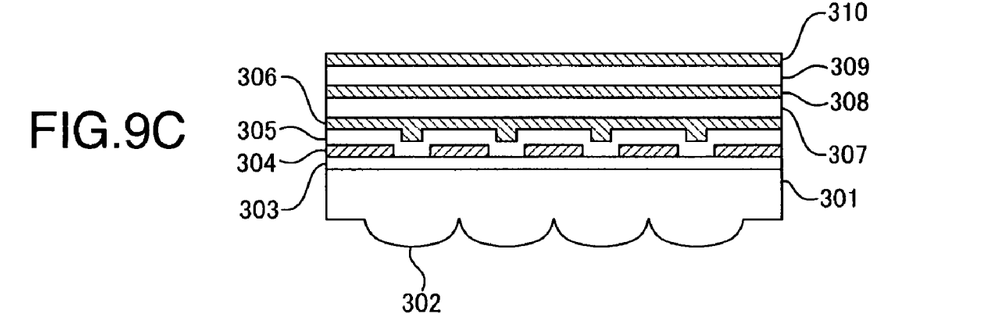
Figure 9D:
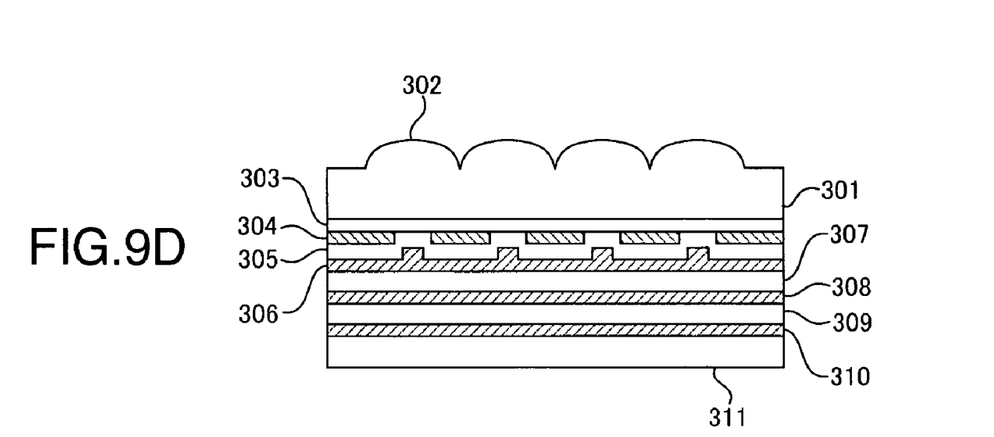

FIG. 8 is a model view showing a construction of an illuminating device according to a third embodiment of the present invention. FIG. 9 is a model view showing a process for manufacturing the illuminating device.

As shown in FIG. 8, the illuminating device 300 according to this embodiment is formed of a light-condensing sheet 313 having lenses 302 each with a light-condensing function ranged on a transparent substrate 301 and adhesion layers for pasting each portion with the light-emitting member. The light-condensing sheet 313 includes spherical lenses formed on the top surface of the glass substrate. Those lenses are made of light transmittance resin. The method for manufacturing the light-condensing sheet 313 is the same as the method described with respect to the first embodiment.

The lens is formed to have a diameter of 75 μm and a height of 16 μm. The lenses are located in the closest packing manner so that the pitch between the adjacent lenses is 80 μm. This design of the lens form and a proper thickness of the substrate make the light-condensing area of each micro lens correspond to an area with a diameter of about 20 μm on the rear surface of the glass substrate.

Then, a transparent conductive layer 303 made of an indium tin oxide film was formed on the opposite surface of the light-condensing sheet 313 to the surface where the lenses are formed by means of the vapor deposition technique. The thickness of the transparent conductive layer 303 is 30 nm. Further, the transparent organic insulating film 304 made of acrylic resin was laminated on the transparent conductive film 303 by means of the vapor deposition technique. Then, an opening 312 with a diameter of 20 μm was formed on the transparent organic insulating layer 304 and immediately below the vertex of each lens formed on the glass substrate by means of the etching technique, so that the corresponding portion of the transparent conductive layer 303 with the opening 312 was exposed. (Refer to FIG. 9A.)

Further, an electroluminescence luminous layer 305 was formed on the transparent organic insulating layer 304 and the transparent conductive layer 303 by means of the vacuum deposition technique. The structure of the luminous layer 305 is the same as that described with respect to the first embodiment. Next, a transparent conductive layer 306 made of an indium tin oxide film was formed by means of the vacuum deposition technique. Then, a transparent insulating layer 307 was laminated on the layer 306 by means of the vacuum deposition technique. The thickness of the layer 307 is 50 nm. (Refer to FIG. 9B.) Further, a transparent conductive layer 308 made of an indium tin oxide film was formed by means of the deposition technique. The thickness of the transparent conductive layer 308 is 30 nm. Then, an electroluminescence luminous layer 309 was formed to have a thickness of 100 nm by means of the vacuum deposition technique. Lastly, an AL layer 310 served as the upper electrode was formed to have a thickness of 50 nm. (Refer to FIG. 9C.) A lower insulating layer 311 was laminated under the AL layer 310. (Refer to FIG. 9D.)

The illuminating device 300 constructed as described above was operated as follows. The outgoing ray of light was examined in detail.

(a) A voltage was applied to the first upper electrode 303 and the first lower electrode 306 in order to cause the element to be active (luminous). It was found from the observation of the luminous state with an optical microscope that only the area with a diameter of 20 μm immediately below a vertex of each light-condensing sheet lens 302 is caused to emit light. Further, the dependency of a luminance upon an angle about an outgoing ray of light, emitted from the luminous layer 305 and then got out of the light-condensing sheet 313, was measured. It was also found from the measurement that letting zero degree be a normal line direction of the light-condensing sheet, the luminance in the direction of zero degree becomes maximum and in the direction of being crossed with the lenticular lens at right angles, in the angle range over +20 and −20 degrees, the luminance is reduced by $\frac{1}{10}$ or less relative than the luminance in the direction of zero degree, that is, the narrow visual field angle characteristic is obtained.

(b) A voltage was applied between the second upper electrode 308 and the second lower electrode 310 in order to cause the element to be active (luminous). It was found from the observatory of the luminous state with an optical microscope that the substantially overall surface of the element is caused to be active. Further, the dependency of a luminance upon an angle about an outgoing ray of light, emitted from the luminous layer 305 and got out of the light-condensing sheet 313, was measured. It was also found from the measurement that letting zero degree be a normal direction of the light-condensing sheet, the luminance is substantially even in the angle range of +80 to −80 degrees, that is, the wide visual field angle characteristic is obtained.

As described above, the visual field angle switchable illuminating device 300 was obtained by a simple operation.

In the third embodiment, the first luminous layer 305 has minute luminous portions formed by patterning the electrode with the insulating layer. In place of patterning the electrode, it is possible to form the minute luminous portions by patterning the luminous layer itself with a shadow mask or the like.

Also in the third embodiment, the laminating sequence of the first luminous layer 305 and the second luminous layer 309 may be reversed.

In the third embodiment, the light-emitting area of the first luminous layer 305 is formed as a circular minute portion located immediately below each light-condensing lens. The light-emitting area of the second luminous layer 309 is formed as the overall surface of the luminous layer. The form, the position and the dimensions of the light-emitting area of each layer 305 or 309 are not limited to those described above. They may be optionally designed according to a target visual field angle characteristic.

Relative to another embodiment, this third embodiment is characterized in that the form, the position, and the dimensions of the light-emitting area may be optionally designed. Concretely, in the first and the second embodiments, at least an insulating area to be used for patterning each electrode is not caused to be luminous. On the other hand, in the third embodiment, the form, the position and the dimensions of the light-emitting area are not limited by the patterned form of the electrode. Hence, the light-emitting area may be optionally designed according to a target visual field angle characteristic.

Fourth Embodiment

<Lamination of Electrode>

Figure 10:
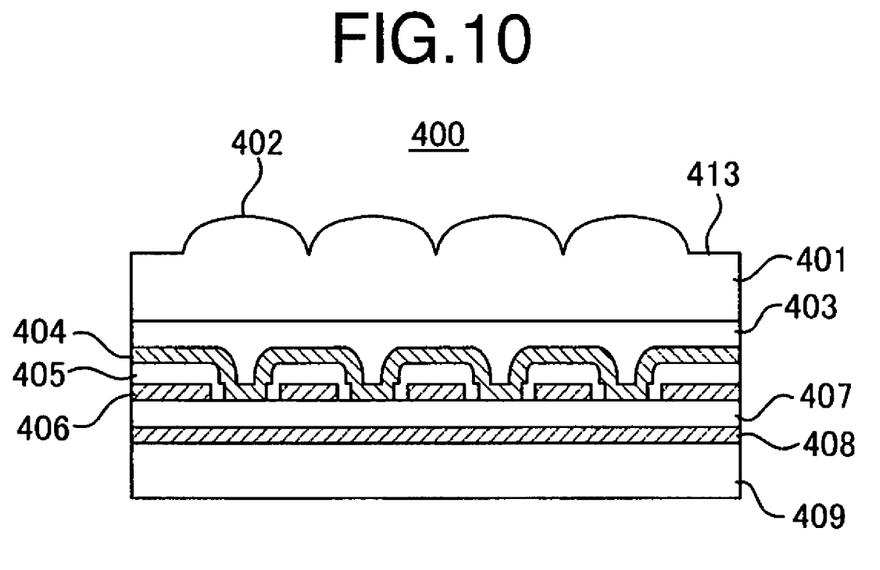
FIG. 10 is a model view showing a structure of an illuminating device according to a fourth embodiment of the present invention.
Figure 11A:
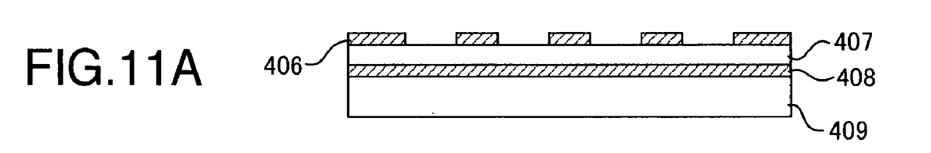
FIGS. 11A to 11D are model views for describing processes for manufacturing an electroluminescent element included in the fourth embodiment of the present invention.
Figure 11B:
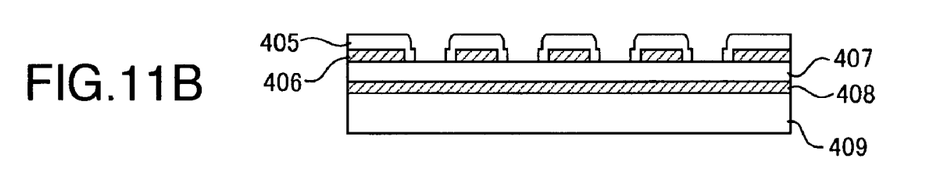
Figure 11C:
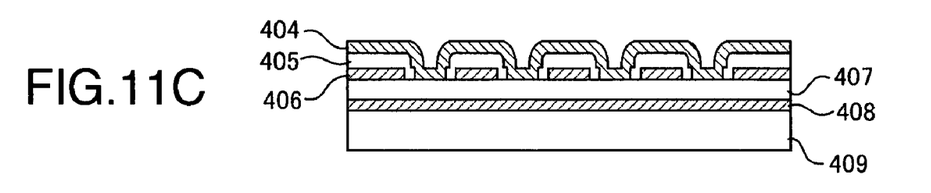
Figure 11D:
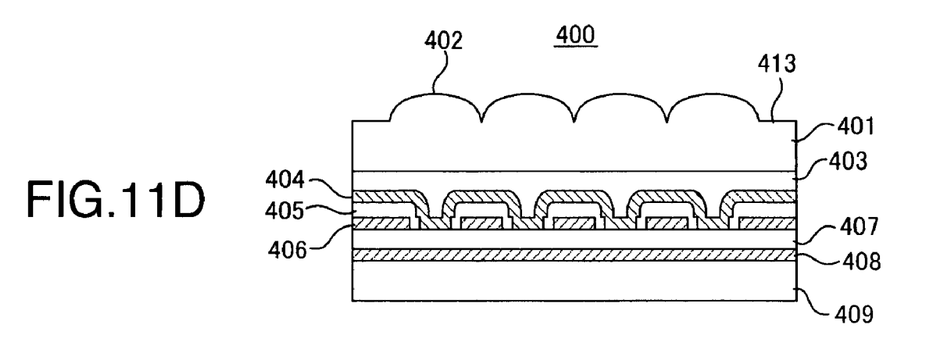

FIG. 10 is a model view showing an illuminating device according to a fourth embodiment of the present invention. FIGS. 11A to 11D are model view showing a process for manufacturing the illuminating device.

As shown in FIG. 10, an illuminating device 400 according to the fourth embodiment is composed of a light-condensing sheet 413 having lenses 402 each with a light-condensing function ranged on a transparent substrate 401 and a light-emitting portion integrally formed on an opposite surface of the transparent substrate 401 to the surface on which the lenses 402 are formed.

The light-condensing sheet 413 includes micro lenses formed on top of the glass substrate. Those lenses are made of light transmittance resin. The lens is formed to have a diameter of 75 µm and a height of 16 µm. Those lenses are located in a closest packing manner so that the pitch between the adjacent lenses is 80 µm. The method for manufacturing the light-condensing sheet is the same as the method described with respect to the first embodiment. Like the first embodiment, an alignment mark is formed on a required portion of the light-condensing sheet 413. The alignment mark is used for aligning the light-emitting member with the light-condensing sheet itself.

As the light-emitting member was formed by coating an $SiO_2$ film as an insulating layer on a metallic substrate 409 by means of the sputtering technique and then laminating an aluminum electrode layer 408 also by means of the sputtering technique. The thickness of the insulating layer is 200 nm and the thickness of the electrode 408 is 100 nm. Further, an organic luminous layer 407 was laminated by means of the vacuum deposition technique. The structure of the luminous layer 407 is the same as that described with respect to the first embodiment.

On the luminous layer 407, an ITO transparent electrode layer 406 with an opening was laminated with a mask pattern. (Refer to FIG. 11A.) The corresponding portions of the top surface of the organic luminous layer 407 with the openings are exposed. The other surface area is covered by ITO. The opening is formed to be circular with a diameter of 30 µm. The openings are located in a closest packing manner so that the pitch between the adjacent openings is 80 µm.

Further, after laminating an organic insulating layer 405 on the ITO transparent electrode layer 406 and the organic luminous layer 407, the openings were formed on the insulating layer 405 by means of the photolithography technique. (Refer to FIG. 11B.) The opening is formed to be circular with a diameter of 20 µm. The center of the opening is aligned with the center of the opening of the electrode layer. An ITO transparent electrode layer 404 was laminated thereon. The layer 404 has a thickness of 100 nm. (Refer to FIG. 11C.) Lastly, the light-condensing sheet 413 and the light-emitting member are bonded in position with a transparent adhesion material 403 through the use of the alignment marks formed on the sheet 413 and the member. (Refer to FIG. 11D.)

The illuminating device 400 constructed as described above was operated as follows. The outgoing ray of light was examined in detail.

(a) A voltage was applied to the lower electrode 408 and the first upper electrode 404 in order to cause the element to be active (luminous). It was found from the observation of the luminous state with an optical microscope that the light-emitting area corresponds to the circular portions each with a diameter of about 20 µm located in the closest packing manner so that the pitch is 80 µm.

Further, the dependency of a luminance upon an angle about an outgoing ray of light, emitted from the light-emitting area and then got out of the light-condensing sheet, was measured. It was also found from the measurement that letting zero degree be a normal line direction of the light-condensing sheet, the luminance in the direction of zero degree becomes maximum and in the angle range over +20 and −20 degrees, the luminance is reduced by $^1\!/_{10}$ or less relative than the luminance in the direction of zero degree, that is, the narrow visual field angle characteristic is obtained.

(b) A voltage was applied to the lower electrode 408 and the first and the second upper electrodes 404 and 406 in order to cause the element to be active (luminous). It was found from the observatory of the luminous state with an optical microscope that the substantially overall surface of the element is caused to be active. Further, the dependency of a luminance upon an angle about an outgoing ray of light, emitted from the light-emitting area and got out of the light-condensing sheet, was measured. It was also found from the measurement that letting zero degree be a normal direction of the light-condensing sheet, the luminance is substantially uniform in the angle range of +80 to −80 degrees, that is, the wide visual field angle characteristic is obtained.

As described above, the visual field angle switchable illuminating device 100 was obtained by a simple operation.

Figure 12:
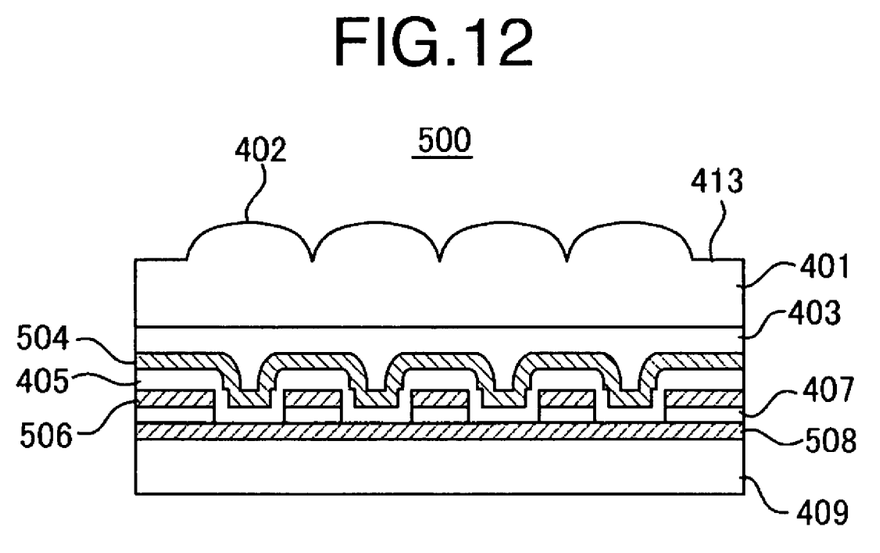
FIG. 12 is a model view showing an illuminating device according to another embodiment of the present invention.

In the fourth embodiment, the lower electrode is formed of one layer and the upper electrode is divided into two layers. Instead, the lower electrode may be divided into two layers and the upper electrode may be formed of one layer. The element composition of the latter is shown in FIG. 12. As shown, the illuminating device 500 includes the two lower electrodes 506 and 508 for one upper electrode 504 formed of one layer.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An illuminating device comprising:
   a light-condensing sheet having a plurality of light-condensing lenses with a light-condensing function ranged on a light transmittance substrate;
   a light-emitting portion opposed to the light-condensing sheet and having a plurality of light-emitting areas that have respective dimensions; and
   a control unit for switching a luminous state of each of the light-emitting areas to a non-luminous state or vice versa;
   wherein the light-emitting portion is composed of an electroluminescent element having a luminous layer and at least a pair of electrodes sandwiching the luminous layer therebetween,
   wherein the electrodes are separated into plural parts by patterning and the control unit controls to switch the luminous state to the non-luminous state or vice versa by selectively supplying each patterned, electrode part with electric power,
   wherein the electrodes include an upper electrode located on top of the luminous layer and a lower electrode located on the bottom of the luminous layer and shifted in position from the pattern form of the upper electrode, and the control unit causes a light-emitting area located in a crossed portion between the upper electrode and the lower electrode to emit light; and
   wherein said plurality of light-emitting areas comprises a small light-emitting area and a large light-emitting area, said small light-emitting area is formed plural corresponding to the plurality of lenses and located closer to the optical axis, and said large light-emitting area is formed at least partially including area between forming area of the small light-emitting area.

2. The illuminating device as claimed in claim 1, wherein the upper and the lower electrodes are patterned in a linear or a rectangular manner and are located in a lattice-shaped manner so that those electrodes sandwich the luminous layer therebetween.

3. The illuminating device as claimed in claim 1, wherein the luminous layer includes a plurality of luminous sub-layers the light-emitting areas of which have respective dimensions and locations.

4. The illuminating device as claimed in claim 1, wherein the light-condensing sheet is an integral combination of the light-condensing lenses and the light transmittance substrate bonded therewith.

5. A display device comprising the illuminating device described in claim 1.

* * * * *